(12) United States Patent
Ghosh et al.

(10) Patent No.: US 10,816,942 B2
(45) Date of Patent: Oct. 27, 2020

(54) MANAGING TIME-SUBSTITUTABLE ELECTRICITY USAGE USING DYNAMIC CONTROLS

(71) Applicant: International Business Machines Corporation, Armonk, NY (US)

(72) Inventors: Soumyadip Ghosh, PeekSkill, NY (US); Jonathan R. Hosking, Scarsdale, NY (US); Ramesh Natarajan, Pleasantville, NY (US); Shivaram Subramanian, Danbury, CT (US); Xiaoxuan Zhang, Park Ridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 15/352,054

(22) Filed: Nov. 15, 2016

(65) Prior Publication Data
US 2017/0060109 A1    Mar. 2, 2017

Related U.S. Application Data (63) Continuation of application No. 13/918,312, filed on Jun. 14, 2013, now Pat. No. 9,563,924, which is a
(Continued)

(51) Int. Cl.
*G05B 13/04*    (2006.01)
*G06Q 50/06*    (2012.01)
(Continued)

(52) U.S. Cl.
CPC ....... *G05B 13/048* (2013.01); *G06Q 30/0206* (2013.01); *G06Q 50/06* (2013.01);
(Continued)

(58) Field of Classification Search
CPC ............... G06Q 50/06; G06Q 30/0206; G06Q 30/0283; G06Q 30/0202; G06Q 30/02;
(Continued)

(56) References Cited

U.S. PATENT DOCUMENTS 9,563,924 B2    2/2017    Ghosh
9,576,327 B2    2/2017    Ghosh
(Continued)

FOREIGN PATENT DOCUMENTS

| JP | 2007259647 A | 10/2007 |
|---|---|---|
| JP | 2010044595 A | 2/2010 |

OTHER PUBLICATIONS

Eskeland, G. S., & Mideksa, T. K. (2010). Electricity demand in a changing climate. Mitigation and Adaptation Strategies for Global Change, 15(8), 877-897. doi:http://dx.doi.org/10.1007/s11027-010-9246-x (Year: 2010).*

(Continued)

*Primary Examiner* — Michael P Harrington
(74) *Attorney, Agent, or Firm* — Daniel Morris; Otterstedt, Wallace & Kammer LLP (57) ABSTRACT

A predictive-control approach allows an electricity provider to monitor and proactively manage peak and off-peak residential intra-day electricity usage in an emerging smart energy grid using time-dependent dynamic pricing incentives. The daily load is modeled as time-shifted, but cost-differentiated and substitutable, copies of the continuously-consumed electricity resource, and a consumer-choice prediction model is constructed to forecast the corresponding intra-day shares of total daily load according to this model. This is embedded within an optimization framework for managing the daily electricity usage. A series of transformations are employed, including the reformulation-linearization technique (RLT) to obtain a Mixed-Integer Pro- (Continued)

gramming (MIP) model representation of the resulting nonlinear optimization problem. In addition, various regulatory and pricing constraints are incorporated in conjunction with the specified profit and capacity utilization objectives.

5 Claims, 5 Drawing Sheets

Related U.S. Application Data continuation of application No. 13/912,181, filed on Jun. 6, 2013, now Pat. No. 9,576,327.

(51) Int. Cl.
  *H02J 3/38* (2006.01)
  *G06Q 30/02* (2012.01)
  *H02J 3/00* (2006.01)

(52) U.S. Cl.
  CPC .... *H02J 3/381* (2013.01); *G05B 2219/40458* (2013.01); *H02J 3/003* (2020.01); *Y04S 20/222* (2013.01); *Y04S 50/14* (2013.01)

(58) Field of Classification Search
  CPC ... H02J 3/003; H02J 3/381; H02J 3/00; Y04S 20/222; Y04S 20/224; Y04S 50/14
  See application file for complete search history.

(56) References Cited

U.S. PATENT DOCUMENTS

| | | | |
|---|---|---|---|
| 2003/0055677 A1* | 3/2003 | Brown | G06Q 30/06 700/291 |
| 2008/0114499 A1 | 5/2008 | Hakim et al. | |
| 2008/0281473 A1 | 11/2008 | Pitt | |
| 2010/0179704 A1 | 7/2010 | Ozog | |
| 2011/0035073 A1 | 2/2011 | Ozog | |
| 2011/0106327 A1 | 5/2011 | Zhou et al. | |
| 2011/0231342 A1 | 9/2011 | Schaible et al. | |
| 2011/0251730 A1 | 10/2011 | Pitt | |
| 2011/0264291 A1* | 10/2011 | Le Roux | G06Q 10/06 700/291 |
| 2012/0004872 A1* | 1/2012 | Oh | G01D 3/10 702/62 |
| 2016/0020608 A1 | 1/2016 | Carrasco et al. | |
| 2016/0020609 A1 | 1/2016 | Carrasco et al. | |

OTHER PUBLICATIONS

Kellova, A. (2008). Statistical approaches to short-term electricity forecasting (Order No. 3341261). Available from ProQuest Dissertations and Theses Professional. (275865109). Retrieved from http://dialog.proquest.com/professional/docview/275865109?accountid=131444 (Year: 2008).*
Corradi, O., Ochsenfeld, H., Madsen, H., & Pinson, P. (2013). Controlling Electricity Consumption by Forecasting its Response to Varying Prices. IEEE Transactions on Power Systems, 28(1), 421-429. doi: 10.1109/tpwrs.2012.2197027 (Year: 2013).*
Mirasgedis, S., Sarafidis, Y., Georgopoulou, E., Lalas, D., Moschovits, M., Karagiannis, F., & Papakonstantinou, D. (2006). Models for mid-term electricity demand forecasting incorporating weather influences. Energy, 31(2-3), 208-227. doi: 10.1016/j.energy.2005.02.016 (Year: 2006).*
Wu, K. (2012). Modeling and planning distributed energy systems online (Order No. 3498375). Available from ProQuest Dissertations and Theses Professional. (927756561). (Year: 2012).*
Wu, Z. (2012). Stratum electricity markets: Toward multi-temporal distributed risk management for sustainable electricity provision (Order No. 3528722). Available from ProQuest Dissertations and Theses Professional. (1080771650). (Year: 2012).*
A. Harvey and S. J. Koopman, "Forecasting hourly electricity demand using time-varying splines," Journal of the American Statistical Association, vol. 88, No. 424, (Dec. 1993), pp. 1228-1236.
Abrate, G.; "Time-of-use pricing and electricity demand response: evidence from a sample of Italian industrial customers"; International Journal of Applied Management Science, vol. 1, No. 1, pp. 21-40; 2008.
Anonymous; "A smart electricity meter that measures and controls individual devices power consumption and shapes overall power consumption based on configurable policies"; http://priorartdatabase.com/IPCOM/000205228; Mar. 21, 2011.
Anonymous; "System and method for sizing and demand management in the smart grid"; http://priorartdatabase.com/IPCOM/000219525; Jul. 5, 2012.
C. A. Dahl, "A Survey of Energy Demand Elasticities in Support of the Development of the NEMS," Technical Report, University Library of Munich, Germany, 1993. Available: ftp://ftp.eia.doe.gov.
C. Chen et al., "An innovative RTP-based residential power scheduling scheme for smart grids", Proceedings of 2011 IEEE International Conference on Acoustics, Speech and Signal Processing (ICASSP), 2011.
C. Jin and P. K. Ghosh, "Coordinated Usage of Distributed Sources for Energy Cost Saving in Micro-grid," North American Power Symposium (NAPS), 2011.
C.J. Wong et al., "Optimized Day-Ahead Pricing for Smart Grids with Device-Specific Scheduling Flexibility", IEEE Journal on Selected Areas in Communications 30 (6), 2012.
Chenrui, J. et al.; "Coordinated Usage of Distributed Sources for Energy Cost Saving in Micro-grid"; 2011 43rd North American Power Symposium (NAPS 2011); 7 pp.; IEEE; 2011.
D. J. Hammerstrom, "Pacific Northwest GridWise™ Testbed Demonstration Projects, Part I: Olympic Peninsula Project," PNNL-17167, Pacific Northwest National Laboratory, Richland, WA, 2007. Available: http://www.pnl.gov.
H. D. Sherali and W. P. Adams, A Reformulation-Linearization Technique for Solving Discrete and Continuous Nonconvex Problems. Kluwer Academic Publishers, Dordrecht/London/Boston, 1999.
K. Train, Discrete Choice Methods with Simulation. Cambridge University Press, Second edition, 2009.
M Roozbehani et al., "Dynamic pricing and stabilization of supply and demand in modern electric power grids", First IEEE International Conference on Smart Grid Communications (SmartGridComm), 2010.
M. He et al., "Multiple Timescale Dispatch and Scheduling for Stochastic Reliability in Smart Grids with Wind Generation Integration", Proceedings of IEEE INFOCOM Mini-Conference, Sep. 13, 2010.
P. M. Guadagni and J. D. C. Little, "A Logit Model of Brand Choice Calibrated on Scanner Data," Marketing Science (11), 1983.
S. Subramanian and H. D. Sherali, "A Fractional Programming Approach to Retail Category Price Optimization," Journal of Global Optimization (48), 2010.
T. L. Wilson, "Energy Conservation with Voltage Reduction—Fact or Fantasy," IEEE Rural Electric Power Conference, Colorado Springs, CO, 2002.
Paul J. Otterstedt, List of IBM Patents or Patent Applications Treated as Related, Jun. 2, 2020, pp. 1-2.

\* cited by examiner

MANAGING TIME-SUBSTITUTABLE ELECTRICITY USAGE USING DYNAMIC CONTROLS

CROSS-REFERENCE TO RELATED APPLICATIONS

The present application is a continuation of U.S. patent application Ser. No. 13/918,312 filed Jun. 14, 2013, which is a continuation of co-pending U.S. patent application Ser. No. 13/912,181 filed Jun. 6, 2013. The entire disclosure of that application is incorporated herein by reference.

STATEMENT REGARDING FEDERALLY SPONSORED RESEARCH

This invention was made with Government support under Contract No.: DE-OE0000190 awarded by the Department of Energy. The Government has certain rights in this invention.

FIELD OF THE INVENTION

The present invention relates to controlling usage of resources including utilities such as electrical power.

BACKGROUND OF THE INVENTION

The peak versus off-peak forecasting of intra-day residential loads is a well-studied problem in conventional electricity grids, where the intra-day prices are either fixed at a constant value, or are allowed to change based on a specific time-of-day (TOD) pattern that is however unchanged from day to day irrespective of the actual prevailing level for the daily electricity demand. Such pricing schemes ignore the true cost of supplying electricity, which, particularly during the peak time periods, may often have to be procured by the supplier at a significantly higher cost, e.g., by turning on a local generator or purchasing from the spot market, to satisfy peak demand. To provide an alternative to the intra-day energy management using the traditional voltage control approach, utility companies may also consider providing dynamic incentives to encourage residential customers to schedule their day-ahead TOD usage based on the projected or actual cost of the electricity supply.

The proactive management of the intra-day usage in this manner requires short-term forecasts for the residential electricity usage. Various methods for intra-day load control have also been considered in the past, while not specifically based on the direct use of dynamic pricing context. For example, the curtailing of appliance usage based on dynamic load conditions, optimally matching a plurality of supply options with static forecasts of demands in a micro-grid, as well as price-driven experimental approaches that provide the customer with a measure of the actual cost of electricity. Furthermore, prior approaches for short-term forecasting have typically neglected the intra-day substitutability of residential usage that can occur due to dynamic pricing, even though for example, customer choice models like the Multinomial Logit (MNL) and Probit models have been widely used in other contexts, e.g. for calculating substitutive cross-product price elasticity of sales within consumer product assortments and for developing pricing optimization models for retail category management.

The MNL model has a few well-known limitations that in certain cases may adversely affect the quality of the prediction. First, the MNL model cannot account for any complementary customer-choice alternatives, and it therefore ignores the possibility that the increase in consumption during one period can be positively correlated with the increase in usage for another time period. Second, the assumption of usage substitutability across the day requires the model to compensate for unsatisfied morning demand by a corresponding increase in evening usage. In practice, complementary demand effects are more pronounced in the case of industrial loads where production-runs that contribute a significant portion of daily usage overlap across several time periods, and the latter restriction can be remedied by adopting a nested Logit approach that partitions A.M and P.M loads.

SUMMARY OF THE INVENTION

Exemplary embodiments of systems and methods in accordance with the present invention provide a practically viable optimization model for utility companies to manage intra-day residential electricity usage by taking into account the time-substitutability of demand as well as the time-dependent customer response to a set of dynamic, usage-dependent price incentive signals. Peak loads are mitigated in such a way that an existing peak does not simply 'migrate' to another time of day. In particular, a Mixed-Integer Programming (MIP) is used to optimize the daily goals for peak load management and profitability in the presence of a price-tariff ladder or any equivalent system for indicating the supply cost, such as a 'red-yellow-green' notification to residential consumers.

In accordance with one exemplary embodiment, the present invention is directed to a system for controlling intra-day electrical load. The system includes an electrical power distribution system having a plurality of customers, at least one electrical power generator, an electrical grid in communication with the electrical power generator and the plurality of customers and an electrical power grid controller to monitor electrical load demand in the electrical power distribution system and to control distribution of electrical power from the electrical power generator to the plurality of customers through the electrical grid. An intra-day electrical load controller is provided in communication with the electrical power grid controller. The intra-day electrical load controller has a timer module configured to monitor a current time and to divide a day into a plurality of time periods, a database containing electrical load data and a current customer price for each one the plurality of time periods, an electrical load prediction module in communication with the database. The electrical load prediction module expresses electrical load during each time period as a function of customer utility, for example an exponential function, during that time period. The customer utility is a function of a customer price for electricity during that time period. The electrical load prediction module also calculates a fraction of total daily electrical usage for each time period by dividing the electrical load for that time period by a sum of all electrical loads for all time periods.

In one embodiment, the database also contains weather condition data, and customer utility is a function of the time of day and weather conditions. In one embodiment, each time period is a separate and distinct time of day interval, and the sum of all time periods equals twenty four hours. The electrical load prediction module uses fractions of total daily electrical usage for all time periods to forecast future intra-day electricity loads for the plurality of time periods. In one embodiment, the electrical load prediction module uses the fractions of total daily load to establish a baseline electrical load for each time period that is stored in the database. The database also includes historical data on electrical demand, and the electrical load prediction module uses these historical data on electrical demand to establish the baseline electrical load for each time period.

In one embodiment, the electrical load prediction module modifies the customer price for electricity during at least one time period to change the customer utility, the electrical load and the fraction of total daily electrical load associated with that time period. Preferably, the electrical load prediction module modifies the customer price for all time periods. In one embodiment, the electrical load prediction modules modifies the customer price to minimize a variance among the fractions of total daily electrical load across all time periods. For example, the electrical load prediction identifies an upper threshold and a lower threshold for any fraction of total daily electrical load in any time period, and modifies the customer price to maintain the fractions of total daily electrical load across all time periods within the upper and lower thresholds. The electrical load prediction can account for a cost of electricity to a supplier of the electrical load and can modify the customer price to maximize profitability to the supplier of the electrical load. The customer price is modified to maximize profitability subject to a pre-defined limit on a total cost of electricity to any single customer.

In one embodiment, the electrical load prediction module uses the established baseline electrical load for each time period and the associated customer price for electricity to determine a baseline total cost to the customer. The customer price for electricity is modified during at least one time period to change the customer utility, the electrical load and the fraction of total daily electrical load associated with that time period while maintaining a modified total cost to the customer at a value less than or equal to the baseline total cost to the customer. In one embodiment, the electrical load prediction modules displays customer price incentives for each one of the plurality of time periods to customers to achieve a desired distribution of fractions of total daily load across all time periods. The customer price incentives are determined from modifying the customer price for electricity to change fractions of total daily electrical load.

The present invention is also directed to a method for regulating and modifying the intra-day electrical load. According to this method, a given day is divided into a plurality of time periods. An electrical load during each one of the plurality of time periods is expressed as a function of a customer utility valuation of electricity consumption during the plurality of time periods. This customer utility valuation is a function of at least one incentive signal that is capable of modifying electricity usage by customers during each one of the plurality of time periods. That is, provided with a given incentive, e.g., customer price for electricity, a customer will change or modify the amount of electricity used. The customer utility valuation can also be a function of a time of day, a day of a given week, a month of given year and weather conditions.

The total electrical load for each time period is expressed using the at least one incentive signal, and a value is determined for the at least one incentive signal in each one of the plurality of time periods to achieve a pre-defined intra-day electrical load profile across all time periods. In one embodiment, a fraction of total daily electrical load or usage in each one of the plurality of time periods is expressed as a ratio of the total electrical load for a each time period divided by the total daily electrical load or usage for a given day. These fractions of total daily electrical load for all time periods are used to forecast future intra-day electricity loads for the plurality of time periods. For example, a baseline electrical load for each time period is established using historical data on electrical demand to establish the baseline electrical load for each time period. Using the fractions of total daily usage to forecast future intra-day electricity loads includes modifying the at least one incentive signal during at least one time period to change the customer utility valuation, the total electrical load and the fraction of total daily electrical load associated with that time period and one or more additional time periods. In one embodiment, the at least one incentive signal is modified concurrently for all time periods.

In one embodiment, the at least one incentive signal is modified to minimize a variance among the fractions of total daily electrical load across all time periods. For example, an upper threshold and a lower threshold are identified for any fraction of total daily electrical load in any time period, and the at least one incentive signal is modified to maintain the fractions of total daily electrical load across all time periods within the upper and lower thresholds. Alternatively, an upper threshold is identified for any fraction of total daily electrical load in any time period, and the at least one incentive signal is modified across all time periods to shift an existing peak time-of-day electrical load from a first time period to a second time period such that the shifted peak time-of-day load does not exceed the upper threshold.

In one embodiment, the at least one incentive signal is a customer price for electricity. When modifying the at least one incentive signal, a cost of electricity to a supplier of the electrical load is accounted for so that the customer price for electricity is modified to maximize profitability to a supplier of the electrical load. In one embodiment, the cost of electricity to the supplier is expressed as an increasing function of total daily electrical load. In addition, the customer price is maximized to maximize profitability subject to a pre-defined limit on a total cost of electricity to any single customer. In one embodiment, the established baseline electrical load for each time period and an associated customer price for electricity is used to determine a baseline total cost to the customer. The customer price for electricity is modified during at least one time period to change the customer utility, the electrical load and the fraction of total daily electrical usage associated with that time period while maintaining a modified total cost to the customer at a value less than or equal to the baseline total cost to the customer.

DETAILED DESCRIPTION

A utility company or an independent system operator (ISO) periodically adjusts its day-ahead pricing (incentive) plan for a group of residential customers based on the latest available forecast for intra-day and total daily usage or load. Given a baseline plan, a first goal takes into account the customer response to time-of-day price incentives and adjusts these incentive values within a pre-defined neighborhood of the baseline price to minimize the deviation of the predicted day-ahead load profile from a desired profile. An overview of a customer-choice prediction based model for intra-day load optimization uses the following notation. T is the number of time periods in a day, where each period will be referred to as a time of day (TOD) interval. M is the number of steps in the price ladder, while $p_t$ is the recommended price per unit of electricity usage for TOD t (primary decision variables). The variable $p_t^0$ is the baseline unit price of electricity for TOD t, and the variable $\bar{p}_{it}$ is the unit price of electricity corresponding to price-ladder index i for TOD t, i=1, . . . , M The variable $v_t$ is set to equal $e^{u_t}$, where $u_t$ is a measure of the customer utility for electricity in time period t and is a function of TOD, price, weather, and other relevant factors. The variable $\bar{v}_{it}$ is the pre-calculated value of $v_t$ obtained by fixing the corresponding price at $\bar{p}_{it}$, and the variable $v_t^0$ is the pre-calculated baseline value of $v_t$ obtained by fixing the corresponding price at $p_t^0$.

The binary decision variables, $x_{it}$, are positive if the price corresponding to price ladder index i for TOD t is chosen, and zero otherwise. The term $\mu_t$ is the MNL predicted fraction (market-share) of total daily usage for TOD t and is given by:

$$\mu_t = \frac{v_t}{\sum_{t=1}^{T} v_t} \quad (1)$$

$(L_t, U_t)$ is the desired lower and upper limits imposed on the market-share of usage for TOD t, while $(s_t^+, s_t^-)$ represents measures of deviation above (below) the upper (lower) threshold for the desired market-share at time period t, respectively. The equation:

$$p_u \equiv \frac{\sum_{t=1}^{T} p_t^0 v_t^0}{\sum_{t=1}^{T} v_t^0}$$

is the upper bound on revenue that is equal to the observed (baseline) revenue value. The variable $\omega$ is the user-defined weight in the objective function for limiting the total deviation of the recommended pricing plan from a baseline plan.

The utility function $u_t$ is calibrated using a specific forecasting model, assuming the availability of an independently calculated estimate for total daily electricity usage (D). The intra-day market-share given by equation (1) is multiplied by D to obtain the corresponding predicted electricity usage. Conversely, any TOD usage target is divided by D to obtain an equivalent goal in terms of market-share. Usage-share based calculations are used for the remainder of this disclosure.

A load-profile optimization formulation is expressed by the following functions.

$$\text{LPOM: Minimize} \sum_{t=1}^{T} \left( s_t^+ + s_t^- + \omega \sum_{i=1}^{M} |\bar{p}_{it} - p_0^t| x_{it} \right) \quad (2a)$$

$$L_t \sum_{r=1}^{T} v_r - s_t^- \leq v_t \leq U_t \sum_{r=1}^{T} v_r + s_t^+, \forall t = 1, \ldots, T \quad (2b)$$

$$v_t = \sum_{i=1}^{M} \bar{v}_{it} x_{it}, \sum_{i=1}^{M} x_{it} = 1, \forall t = 1, \ldots, T \quad (2c)$$

$$\sum_{t=1}^{T} \sum_{i=1}^{M} \bar{p}_{it} \bar{v}_{it} x_{it} \leq p_u \sum_{t=1}^{T} v_t \quad (2d)$$

$$x \text{ binary}, (s, v) \geq 0. \quad (2e)$$

The objective function (2a) minimizes a measure of the deviations from the desired upper and lower limits on TOD share (2b) by selecting an optimal vector of price incentives from the tariff ladder represented using constraints (2c) and (2e) that require exactly one price point to be selected from the ladder for every time period, while also satisfying a consumer bill protection constraint (2d) that ensures that the cost to the consumer does not exceed the baseline value. A secondary goal is included in the objective function (2a) via a user-defined weight $\omega$ to encourage continuity between successive pricing plans by limiting the deviation of the recommended prices from their baseline values.

The LPOM problem does not require the explicit calculation of market-shares ($\mu_t$) using equation (1), thereby retaining a computationally advantageous linear structure. Such a formulation does not allow the utility company to directly manage TOD usage-driven costs and revenue. Toward this, additional notation is used to analyze a related profit maximization objective function, subject to the aforementioned bill-protection constraint, where the unit cost is specified as an increasing staircase (step) function of hourly usage, as follows. The variable N is the number of unit cost levels, while $\bar{c}_j$ is the unit cost of supplying electricity for usage share range level j $[\bar{\mu}_{j-1}, \bar{\mu}_j]$, where cost-level index j=1, . . . , N. The variable $y_{jt}$ is the auxiliary binary variables that are positive if the unit cost incurred for TOD t is $\bar{c}_j$, and zero otherwise.

Figure 1:
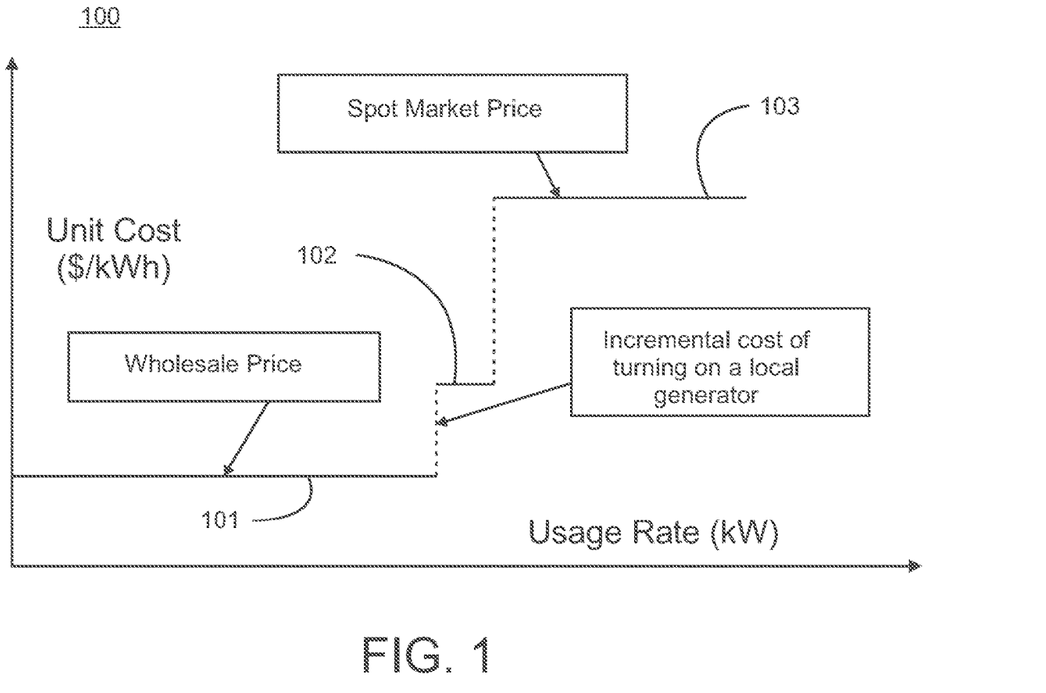
FIG. 1 is a graph illustrating incremental cost of electrical power to a power supplier.

An illustrative example of a three-level unit-cost structure 100 is shown in FIG. 1 and is based on an experimental setup employed during a smart-grid demonstration project that utilized distributed diesel generators to provide emergency backup supply for a relatively limited duration. The lowest level 101 approximates the baseline cost under normal load conditions, followed by a cost increment 102 of activating a local supply option. The third and final level 103 represents a cost spike caused by procuring electricity from the spot market.

Given a staircase unit-cost (marginal cost) structure, a profit-maximization model for intra-day load management can be formulated as shown below:

$$\text{PMM: Maximize} \sum_{t=1}^{T} \sum_{i=1}^{M} \bar{p}_{it} x_{it} \mu_t - \sum_{t=1}^{T} \sum_{j=1}^{N} \bar{c}_j y_{jt} \mu_t \quad (3a)$$

$$\sum_{j=1}^{N} \bar{\mu}_{j-1} y_{jt} \leq \mu_t \leq \sum_{j=1}^{N} \bar{\mu}_j y_{jt}, \sum_{j=1}^{N} y_{jt} = 1, \sum_{i=1}^{M} x_{it} = 1, \forall t = 1, \ldots, T \quad (3b)$$

$$\mu_t = \frac{\sum_{i=1}^{M} \overline{v}_{it} x_{it}}{\sum_{t=1}^{T} \sum_{i=1}^{M} \overline{v}_{it} x_{it}} \quad (3c)$$

$$\sum_{t=1}^{T} \sum_{i=1}^{M} \overline{p}_{it} x_{it} \mu_t \le p_u \quad (3d)$$

$$x, y \text{ binary}, \mu \ge 0. \quad (3e)$$

The profit-maximization problem (PMM) has a discrete nonlinear optimization structure primarily due to the presence of the bilinear product terms in the profit maximization objective (3a), and the nonlinear expression for MNL market-share (3c). For clarity of representation, the ω-weighted price plan deviation penalty is omitted in (3a). The staircase function for unit-cost is modeled using (3b) and (3e), which ensure that exactly one unit-cost level is used for each time period and corresponds to the prevailing usage level for that time period. Revenue is limited to be no more than its baseline value via (3d).

The PMM problem is relatively difficult to solve to optimality directly but can be transformed into a computationally tractable formulation by exploiting the fractional programming structure of market-share (3c) and by employing the reformulation-linearization technique (RLT) as shown below:

$$V \equiv \frac{1}{\sum_{t=1}^{T} \sum_{i=1}^{M} \overline{v}_{it} x_{it}}, \forall t = 1, \ldots, T \quad (4a)$$

$$w_{it} \equiv V x_{it}, \forall (i, t) \quad (4b)$$

The nonlinearity due to (3c) is eliminated via transformations at the expense of introducing additional bilinear product terms (Vx). The revenue in (3a) and (3d) is expressed in terms of the bilinear terms Vx that can be subsequently linearized using the RLT by introducing pre-calculated coefficients ($\underline{V}, \overline{V}$) that represent lower and upper bounds for V, respectively. The cost-related bilinear terms yμ in (3a) can be linearized in a similar manner to recover an equivalent Mixed-Integer Program (MIP) formulation presented below, which can be solved to near-optimality using an effective commercial MIP solver.

$$PMMIP: \text{Maximize} \sum_{t=1}^{T} \sum_{i=1}^{M} \overline{p}_{it} \overline{v}_{it} w_{it} - \sum_{t=1}^{T} \sum_{j=1}^{N} \overline{c}_j \overline{v}_{it} z_{jt} \quad (5a)$$

$$\sum_{j=1}^{N} \overline{\mu}_j y_{jt} \le \mu_t \le \sum_{j=1}^{N} \overline{\mu}_{j+1} y_{jt}, \sum_{j=1}^{N} y_{jt} = 1, \forall t = 1, \ldots, T \quad (5b)$$

$$\sum_{j=1}^{N} z_{jt} = \mu_t, 0 \le y_{jt} - z_{jt} \le 1 - \mu_t \forall t = 1, \ldots, T \quad (5c)$$

$$\mu_t = \sum_{i=1}^{M} \overline{v}_{it} w_{it}, \sum_{i=1}^{M} w_{it} = V, \sum_{i=1}^{M} x_{it} = 1, \forall t = 1, \ldots, T \quad (5d)$$

$$\underline{V} x_{it} \le w_{it} \le \overline{V} x_{it}, \forall (i, t) \quad (5e)$$

$$\underline{V}(1 - x_{it}) \le V - w_{it} \le \overline{V}(1 - x_{it}), \forall (i, t) \quad (5f)$$

$$\sum_{t=1}^{T} \sum_{i=1}^{M} \overline{v}_{it} w_{it} = 1 \quad (5g)$$

$$\sum_{t=1}^{T} \sum_{i=1}^{M} \overline{p}_{it} \overline{v}_{it} w_{it} \le p_u \quad (5h)$$

$$x, y \text{ binary}, 0 \le \mu \le 1, \underline{V} \le V \le \overline{V}, w \ge 0, z \ge 0. \quad (5i)$$

The underlying linear programming relaxation of Model PMMIP can be strengthened by adding additional valid inequalities for all (j, t) as follows:

a. Multiply the inequalities in (5b) by $y_{jt}$ and $(1-y_{jt})$, discard product terms ($y_{jt} y_{kt}$, j≠k), and linearize the resultant bilinear product terms using the RLT as shown below:

$$\overline{\mu}_{j-1} y_{jt} \le z_{jt} \le \overline{\mu}_j y_{jt} \quad (6a)$$

$$\sum_{l=1, l \neq j}^{N} \overline{\mu}_{l-1} y_{lt} \le \mu_t - z_{jt} \le \sum_{l=1, l \neq j}^{N} \overline{\mu}_l y_{lt} \quad (6b)$$

b. Next, let $$\eta \equiv \frac{1}{V} = \sum_{t=1}^{T} \sum_{i=1}^{M} \overline{v}_{it} x_{it}, \quad (7a)$$

$$\overline{\eta} = \frac{1}{\underline{V}}, \underline{\eta} = \frac{1}{\overline{V}}, \underline{\eta} \le \eta \le \overline{\eta}, \text{ and} \quad (7b)$$

$$h_{jt} \equiv \eta y_{jt}. \quad (7c)$$

c. Multiply (5b) by η and employ the RLT to linearize the resultant bilinear terms of the type (7c) noting (7a) and (7b), to generate the following set of valid inequalities:

$$\underline{\eta} y_{jt} \le h_{jt} \le \overline{\eta} y_{jt} \quad (8a)$$

$$\eta - \overline{\eta}(1 - y_{jt}) \le h_{jt} \le \eta - \underline{\eta}(1 - y_{jt}) \quad (8b)$$

$$\sum_{j=1}^{N} \overline{\mu}_j h_{jt} \le v_t \le \sum_{j=1}^{N} \overline{\mu}_{j+1} h_{jt}, \sum_{j=1}^{N} h_{jt} = \eta, \forall t = 1, \ldots, T \quad (8c)$$

Although (6a-b) and (8a-c) are implied in the discrete sense, they serve to improve the underlying continuous representation. A computational analysis of these models, and the empirical effects of adding (6a-b) and (8a-c) to PMMIP is discussed below. If the cost structure for a utility company was specified using a continuous curve, the curve would first be discretized using a suitable unit-cost staircase function that can be subsequently linearized using the RLT of the present invention.

Computational results are illustrated for the load optimization models (2a-e) and (5a-j) using an MNL model calibrated on historical hourly load data obtained from a variety of real-life sources including one derived from a dynamic pricing experiment performed in the Olympic Peninsula area in Washington, USA as part of the Pacific Northwest (PNW) smart-grid project during 2006-2007. The participants in the real-time pricing (RTP) group of the PNW project were exposed to a measure of the actual prevailing cost of electricity. The other data sets were provided by commercial utility companies and did not include pricing data, and were used only to gauge the quality of the MNL model fit from a practical implementation perspective.

Input data for calibrating the MNL model included the hourly load history, hourly prices (if available) and the ambient outdoor temperature for TOD t in degrees Fahrenheit ($\tau(t)$). The following MNL utility functional form for TOD usage yielded the best empirical fit in terms of the mean absolute percentage error (MAPE):

$$u_t = \alpha_{0t} + \alpha_{1t}HDD(t) + \alpha_{2t}CDD(t) + \alpha_{3t}WEEKEND(t) + \beta_t \ln(p_t) \quad (9)$$

where:
$\alpha_{qt}$, q=1, 2, 3, are parameters to be estimated, $\beta_t$=price effect coefficient to be estimated, $HDD_t$=heating degree-day coefficient=max(0, 65−$\tau(t)$)/65, $CDD_t$=cooling degree-day coefficient=max(0, $\tau(t)$−65)/65, and WEEKEND(t)=an indicator variable that is set to 0 for weekdays, 1 for weekends.

The parameters in (9) were estimated by maximizing the log-likelihood objective function associated with MNL. A forecast for total daily load (D) was obtained using the ARIMAX forecasting module of the SPSS statistical software package, which allowed calculating TOD usage for any time period t as D $\mu_t$. While the historical load-share weighted average of TOD prices can be used as an additional regression variable, the resultant improvement in the model fit and prediction is negligible and, therefore, excluded. The use of (3d) in conjunction with the revenue maximization component in (3a) typically ensures that the load-share weighted average of the recommended TOD prices is maintained close to its baseline value.

Table I displays the model fit results for hourly load forecasts (obtained by multiplying the SPSS forecast for daily load and the MNL prediction for market-shares) for training data as well as for a hold-out sample that consisted of the final fourteen days of historical data. Column 1 lists the data source used for calibration, and the duration of the historical data, while Columns 2 and 3 tabulate the average MAPE values for the model-fit with respect to the training data, and the TOD load prediction for the hidden sample, respectively. The overall computational time required for model calibration is recorded in Column 4.

TABLE I

Statistical MNL Model Fit

| Data Source and Duration | Average MAPE (%) | | CPU Time (seconds) |
|---|---|---|---|
| | Training Data | Hold-out Sample | |
| PNW (RTP) May 2006-March 2007 | 14.9 | 19.0 | 17 |
| UTILITY1 June 2011-April 2012 | 1.6 | 5.5 | 6 |
| UTILITY2 January 2012-March 2012 | 3.0 | 9.0 | 3 |
| UTILITY3 January 2012-April 2012 | 3.2 | 10.0 | 3 |
| UTILITY4 May 2011-May 2012 | 2.2 | 7.0 | 13 |

Given the relatively small population of participants (between 30-35 households) in the RTP group, the statistical model fit for the PNW data set exhibited the largest average MAPE value. In general, the results achieved in Table I are competitive with those obtained using an alternative state-space modeling approach. Using (1) and (9), the elasticity of load-share (or usage) for time t with respect to its own price $p_t$ can be calculated as follows:

$$\gamma_{tt} = \frac{p_t}{\mu_t} \frac{\partial \mu_t}{\partial p_t} = \beta_t(1 - \mu_t) \quad (10)$$

The elasticity of the load share (or usage) for a different time period k with respect to the price for TOD t is given by:

$$\gamma_{kt} = \frac{p_t}{\mu_k} \frac{\partial \mu_k}{\partial p_t} = -\beta_t \mu_t \quad (11)$$

For practical reasons, the price effect coefficients ($\beta$) in (10) and (11) were empirically limited to non-positive values. In the PNW project, the thermostats managed by the RTP group members were specially instrumented to allow households to specify their desired tolerance to indoor temperature based on their willingness to pay the prevailing price of electricity calculated using a market-clearing mechanism, thereby automating an individual household's response to price changes based on their price sensitivity and desired comfort level.

Figure 2:
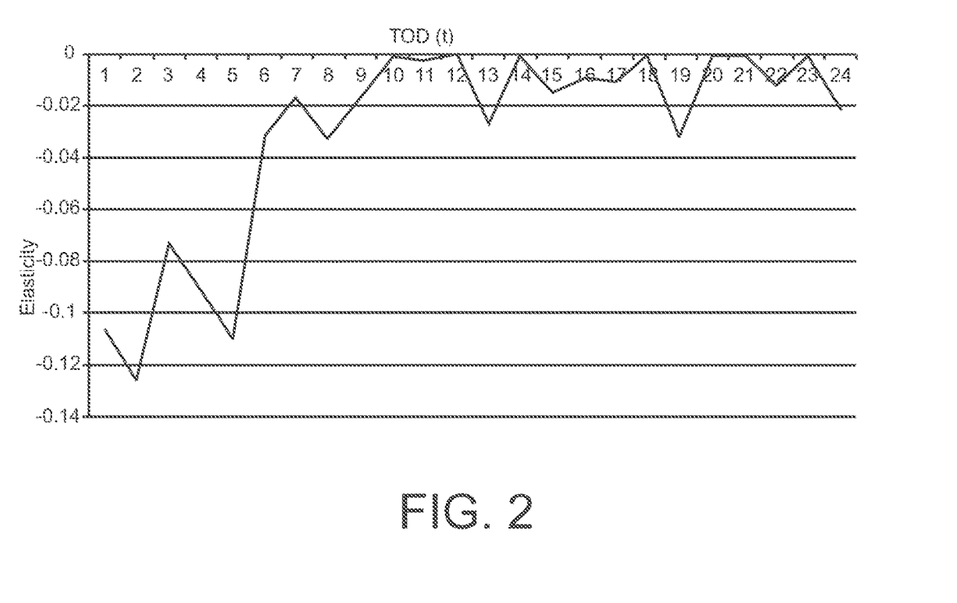
FIG. 2 is a graph illustrating an embodiment of time of day price-elasticity values for a given group using historical hourly load data.

Referring to FIG. 2, the TOD price-elasticity values (10) for the RTP group estimated using historical hourly load data between October 2006 and March 2007 are illustrated. The daily usage during this time period was relatively high due to the space heating requirements necessitated by the prevailing cold weather. The time-dependency of price sensitivity in FIG. 2 can be discerned noting that early morning loads in winter were relatively more sensitive to the price of electricity compared to the rest of the day. The elasticity values are in the range [−0.14, 0], indicating a relatively weak sensitivity of TOD usage to price. For example, a 10% increase in price between 4 A.M-5 A.M can be expected to reduce its market-share by approximately 1% (e.g., 5% to 4.95%). On the other hand, a small reduction in peak load may be sufficient to move unit costs down to a lower level, depending on the cost structure and the prevailing load conditions. These price elasticity values are used to calibrate the TOD utility functions (9) employed in the empirical analysis of the MNL-based pricing models.

The proposed optimization models are analyzed using historical hourly usage data for the RTP group (T=24) for the ten highest total-load days, all of which occurred during the winter months of December 2006 and January 2007. The observed TOD prices and market-shares for the RTP group were chosen as the baseline reference values. The price ladder is restricted to M=100 integer increments within the historically observed minimum and maximum prices to avoid unrealistic pricing recommendations, and the values are calculated for the bounds ($\underline{V}, \overline{V}$) by minimizing and maximizing (7a) subject to the constraints of LPOM problem. The unit-cost and load profile tolerances for a given day were chosen to reduce the resultant peak load by a percentage point of the historical peak load observed for that day. An additional cost level (N=3) aimed at reducing peak hourly load by at least half a percentage point is included in case the primary goal proved to be overly restrictive, as shown below in (12) and Table II.

$$L_t = \min_t \{\mu_t^0\}, \; U_t = \max_t \{\mu_t^0\} - 0.01 \quad (12)$$

TABLE II

Unit-cost Structure

| Unit cost | Market-share range |
|---|---|
| $\min_{t}\{p_t^0\}$ | $(0, U_l]$ |
| $\sum_{t=1}^{T} p_t^0 / T$ | $(U_l, U_t + 0.005]$ |
| $\max_{t}\{p_t^0\}$ | $(U_t + 0.005, 1]$ |

The optimization models were solved to optimality using CPLEX 12.0 and an Intel Quad-core 2.33 GHz computer having 3 GB of RAM. Although CPLEX has a rich selection of tuning parameters to beneficially guide the optimization engine, the default settings were used to minimize bias with respect to the choice of the optimization solver and the optimization models analyzed.

Figure 3:
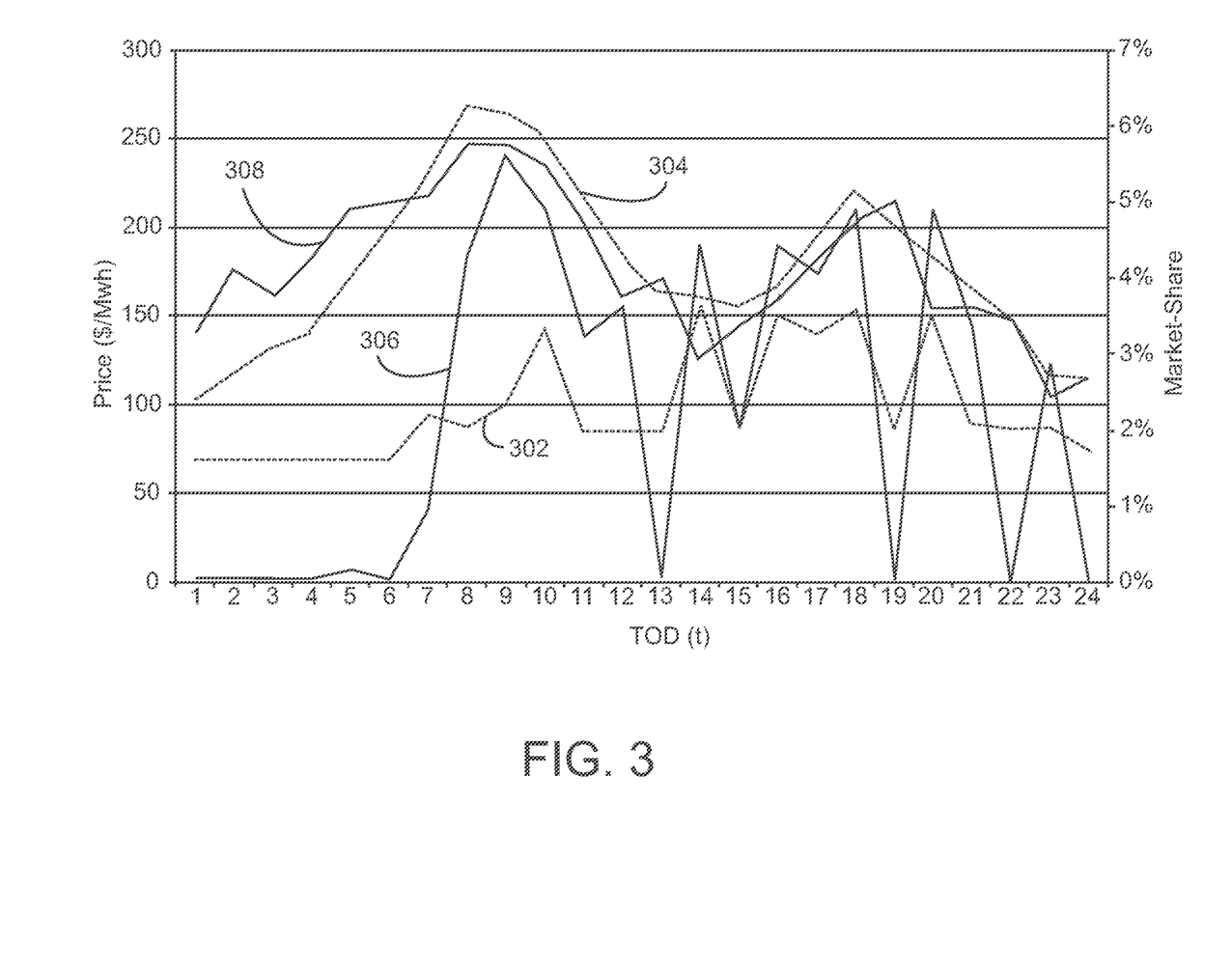
FIG. 3 is a graph illustrating an embodiment of a comparison of the recommended time of day prices in dollars per Megawatt-hour obtained using optimized market-share percentages.

Referring to FIG. 3 a comparison of the recommended TOD prices in dollars per Megawatt-hour obtained by solving Model PMMIP to the optimized market-share percentages, with their corresponding baseline values for a particular winter day when the daily load for the RTP group attained its highest value (538 Kilowatt-hours) is illustrated. The price axis is shown on the left and the market-share axis on the right. The baseline prices 302 and baseline market-shares 304 are shown in dashed lines, and the corresponding optimized price 306 and optimized share 308 are illustrated in solid lines.

As illustrated in FIG. 3, the MNL-based optimization model shifts a portion of the morning peak load to earlier and more price elastic times of the day using a combination of peak and off-peak prices. In contrast, the overall evening load profile changes relatively mildly compared to the baseline, which is attributable to its low price sensitivity. The resultant behavior is consistent with the experimental findings of the PNW project where customers in the RTP group responded proactively to expected peak hour price spikes during winter by pre-heating their homes prior to 6 A.M, taking advantage of the attractive off-peak prices on offer. The baseline TOD price that were generated via a market-clearing mechanism was successful in inducing a peak load shift to an earlier time of day, but was only mildly effective in limiting the resultant peak-load magnitude measured relative to the counterfactual load. In comparison, it can be seen from FIG. 3 that Models PMMIP and LPOM have the potential to not only shift peak usage, but also mitigate the resultant peak in a revenue neutral manner by taking into account the time-substitutability and TOD-price sensitivity of thermal loads that dominate residential usage. The fluctuation in the recommended prices over time observed in FIG. 3 can be reduced by increasing the value of ω (a value of $10^{-4}$ was used) in concert with tighter price bounds.

As far as the empirical performance and achieved solution quality, all LPOM instances were solved to optimality using the default root node analysis of CPLEX 12.0 without requiring additional branching, while consuming less than one second of CPU time, empirically validating the computational advantage of its linear structure. Table III presents statistics on the achieved cost and revenue values for each LPOM instance. Column 1 of Table III lists the total load for the day, and Columns 2 and 3 records the baseline revenue, and achieved revenue, respectively. Similarly, Columns 4 and 5 note the corresponding pair of costs, and Columns 6 and 7 tabulate the peak share values.

TABLE III

Results for Model LPOM

| Total Load | Revenue ($) | | Cost($) | | Peak Share (%) | |
|---|---|---|---|---|---|---|
| | Baseline | Final | Baseline | Final | Baseline | Final |
| 538 | 101.0 | 78.5 | 85.7 | 74.9 | 6.3 | 5.8 |
| 526 | 78.8 | 60.5 | 62.9 | 55.5 | 6.5 | 6.0 |
| 501 | 134.3 | 105.7 | 93.7 | 73.4 | 7.0 | 6.5 |
| 481 | 105.0 | 85.8 | 84.6 | 55.2 | 6.8 | 6.4 |
| 471 | 143.6 | 117.4 | 93.2 | 73.4 | 6.5 | 6.0 |
| 465 | 52.7 | 35.1 | 49.6 | 49.1 | 6.3 | 5.9 |
| 465 | 105.4 | 82.5 | 87.5 | 66.0 | 6.3 | 5.8 |
| 451 | 81.7 | 63.7 | 95.5 | 68.3 | 6.8 | 6.3 |
| 445 | 48.8 | 40.2 | 34.4 | 32.5 | 7.1 | 6.5 |
| 433 | 63.1 | 47.9 | 52.3 | 51.9 | 7.7 | 7.2 |

The last two columns of Table III indicate that Model LPOM achieved a peak share reduction of half a percentage point on average. The one percentage point reduction goal was not achieved for any instance using the chosen price bounds. The reduction in the peak share from its baseline value was accompanied by a corresponding drop in the cost recorded in Columns 4 and 5. On the other hand, Columns 2 and 3 indicate that such a cost improvement was achieved at the expense of revenue. On average, a 16% reduction in cost was accompanied by a 22% loss in revenue, indicating that Model LPOM may generate unprofitable load-management solutions relative to the baseline unless appropriate profitability side-constraints are added to the formulation.

A contrasting profitability analysis using Model PMMIP is presented in Table IV, with Column 1 recording the total load and Columns 2 and 3 presenting the baseline and optimized cost. Columns 4 and 5 record the baseline and achieved peak market-shares, respectively. The bill protection constraint was tight at optimality for all PPMIP instances solved, with the achieved revenue equal to its baseline value recorded in Column 2 of Table III. Columns 4 and 5 of Table IV indicate that a peak load reduction of half a percentage point was achieved for each instance, i.e. peak unit costs dropped to a lower level, on par with the corresponding result obtained using LPOM, and accompanied by a cost reduction in each instance, as shown in Columns 2 and 3 of Table IV.

TABLE IV

Cost and Peak Load Reduction using Model PMMIP

| Total Load | Cost ($) | | Peak-share (%) | |
|---|---|---|---|---|
| | Baseline | Final | Baseline | Final |
| 538 | 85.7 | 70.2 | 6.3 | 5.8 |
| 526 | 62.9 | 49.6 | 6.5 | 6.0 |
| 501 | 93.7 | 55.7 | 7.0 | 6.5 |
| 481 | 84.6 | 41.7 | 6.8 | 6.3 |
| 471 | 93.2 | 56.2 | 6.5 | 6.0 |
| 465 | 49.6 | 48.8 | 6.3 | 5.8 |
| 465 | 87.5 | 55.9 | 6.3 | 5.8 |
| 451 | 95.5 | 56.0 | 6.8 | 6.3 |
| 445 | 34.4 | 32.6 | 7.1 | 6.6 |
| 433 | 52.3 | 45.3 | 7.7 | 7.2 |

On average, a 27% reduction in cost was achieved relative to the baseline, which also represents a direct measure of the incremental profitability, given the revenue-neutrality of the achieved solution. Furthermore, the cost reduction achieved by explicitly modeling TOD usage-shares to manage profitability represents an eleven percentage point improvement relative to Model LPOM.

As far as the computational performance of Model PPMIP, Tables V and VI present sample results that also delineate the incremental impact of adding (6) and (8) to the formulation. Column 1 of Table V lists the total load for the planning day, while the second and third columns tabulate the number of branch-and-bound subproblems enumerated and the CPU time consumed, respectively, including, and excluding inequalities (6) and (8).

TABLE V

Empirical Impact of Adding (6) and (8) to Model PMMIP

| Total Load | Nodes Enumerated | | CPU Time (seconds) | |
|---|---|---|---|---|
| | Adding (6, 8) | Without (6, 8) | Adding (6, 8) | Without (6, 8) |
| 538 | 0 | 634 | 6.9 | 21.6 |
| 526 | 526 | 565 | 7.6 | 14.3 |
| 501 | 435 | 520 | 29.7 | 20.6 |
| 481 | 0 | 538 | 4.8 | 22.5 |
| 471 | 875 | 913 | 45.2 | 41.0 |
| 465 | 3136 | 4195 | 93.5 | 86.3 |
| 465 | 0 | 543 | 6.4 | 22.3 |
| 451 | 479 | 530 | 5.7 | 31.2 |
| 445 | 4607 | 549 | 15.2 | 24.6 |
| 433 | 492 | 4473 | 5.0 | 26.3 |

From Table V it is observed that unlike LPOM, the PPMIP instances were harder to solve to optimality, consuming up to 94 seconds of CPU time, and requiring the enumeration of up to 4607 branch-and-bound subproblems in the worst case. On the other hand, the addition of (6) and (8) resulted in an average reduction of 40% in the computational time required to solve PMMIP to optimality. The overall flexibility afforded by the profitability model within a practical planning application is likely to outweigh the disadvantage of increased run times relative to the load profile optimization approach.

Table VI similarly compares the lower bound objective function value of the underlying LP relaxation and the upper bound expressed in terms of the relative optimality gap achieved using the default root node analysis of CPLEX 12.0.

TABLE VI

Comparative Root-Node Analysis of Model PMMIP including and excluding (6) and (8)

| Total Load | Lower Bound | | Upper Bound | |
|---|---|---|---|---|
| | Adding (6, 8) | Without (6, 8) | Adding (6, 8) | Without (6, 8) |
| 538 | 31.03 | 31.90 | 0.00% | 5.16% |
| 526 | 29.20 | 29.75 | 0.02% | 0.25% |
| 501 | 78.68 | 79.26 | 0.43% | 86.75% |
| 481 | 63.31 | 64.01 | 0.00% | 1.19% |
| 471 | 103.86 | 104.53 | 19.43% | 19.89% |
| 465 | 4.22 | 4.29 | 16.59% | 20.17% |
| 465 | 49.42 | 50.31 | 0.00% | 2.30% |
| 451 | 25.81 | 26.66 | 0.01% | 2.37% |
| 445 | 16.32 | 16.44 | 0.02% | 9.73% |
| 433 | 17.75 | 17.75 | 0.02% | 0.31% |

The statistics presented in Table VI indicate that a typical practical requirement of quick and near-maximally profitable solutions can be potentially achieved by employing an effective root node analysis module. In particular, it is observed from Columns 4 and 5 that the addition of (6) and (8) helped obtain good quality feasible solutions without any branching. A comparison of the results in Columns 2 and 3 show that a tighter upper bound was accompanied by a corresponding improvement in the lower bound for every instance, resulting in an eleven percentage point reduction in the optimality gap on average. Furthermore, optimal solutions are obtained using the root node analysis available in CPLEX 12.0 for three instances, and near-optimal solutions (within 0.43% of optimality) for six instances, as compared to two near-optimal solutions obtained without adding (6) and (8). The average optimality gap achieved using the root node analysis in concert with (6) and (8), and the corresponding average CPU time consumed, was 3.65%, and 6.1 seconds respectively (root-node CPU times are not shown for brevity), which may be reasonable from a practical perspective.

Discrete optimization models are used that recommend day-ahead pricing plans to manage time-of-day (TOD) residential electricity loads in a cost-effective manner by taking into account the time-substitutability of TOD demand, as well as the time-dependent customer response to the price changes. A Multinomial Logit (MNL) prediction model is embedded within a load optimization framework to address two different objectives. The first approach prescribes a computationally advantageous Mixed-Integer Programming (MIP) model to identify a pricing plan that satisfies a desired usage profile, whereas the second approach analyzes a nonconvex nonlinear profitability problem that directly manages TOD demand-driven costs specified using a staircase unit-cost structure, while also ensuring consumer bill-protection. A sequence of transformations is employed to reformulate this nonlinear optimization problem as a profit-maximization MIP and derive additional valid inequalities by gainfully employing the Reformulation-Linearization Technique (RLT) to tighten the underlying LP relaxation and improve its empirical effectiveness. Historical data from a variety of real-world sources are used to calibrate the underlying MNL model and measure the quality of model fit on training data and the TOD load predictions for a hold-out sample. CPLEX 12.0 is used to analyze several MIP instances derived from experimental data. Significant reductions in cost were observed by optimally shifting peak loads and hence reducing the dependence on spot-market electricity usage. Near-optimal solutions were obtained within a reasonable amount of time, indicating that the optimization methodology can be adopted within practical intra-day load management and day-ahead pricing applications after adding appropriate practical safeguards.

Figure 4:
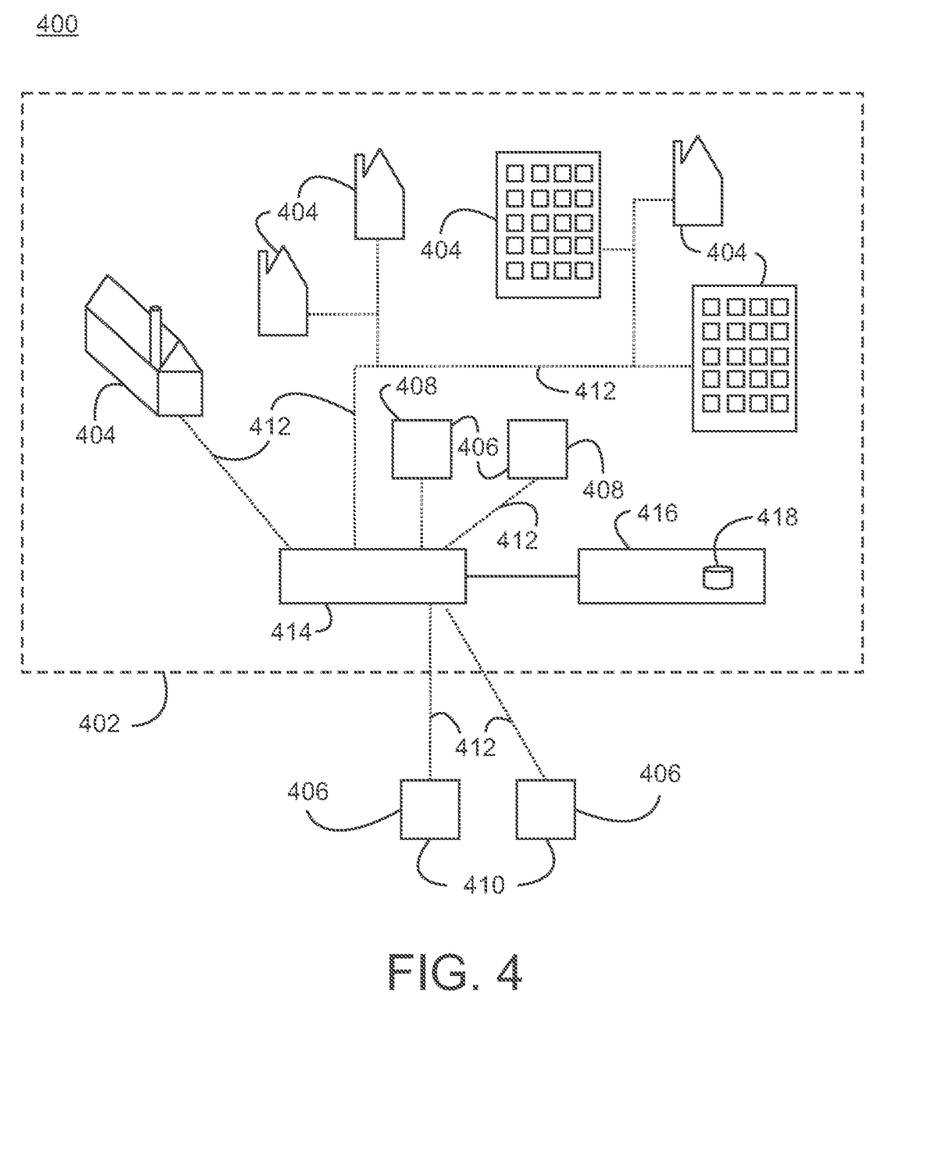
FIG. 4 is an illustration of an embodiment of an electrical distribution system used to control intra-day electrical load demand in accordance with the present invention.

Referring to FIG. 4, in one exemplary embodiment, the present invention is directed to a system 400 for controlling intra-day electrical load. The system includes an electrical power distribution system 402 that provides electrical power to a plurality of customers 404. Suitable customers include, but are not limited to, single family residences, multi-family residences, commercial properties, manufacturing facilities and government offices. The electrical power distribution system includes at least one electrical power generator 406. Suitable power generators are known and available in the art and include coal powered generators, nuclear powered generators, fossil fuel powered generators and hydro-electrical powered generators. These generators can be internal generators 408, i.e., located within and owned by the electrical power distribution system, and external power generators 410, i.e., located outside the power distribution system and owned by a third party. In general, the outside power generators, e.g., the spot market, carry a higher cost to the electrical power distribution system and, therefore, affect the profit margin of the electrical power distribution system.

An electrical grid 412 is in communication with the electrical power generators and the plurality of customers in order to deliver or distribute power to the customers. Also in contact with the electrical grid is an electrical power grid controller 414 to monitor the electrical load demand in the electrical power distribution system and to control distribution of electrical power from the electrical power generators to the plurality of customers through the electrical grid. An intra-day electrical load controller 416 is provided in communication with the electrical power grid controller. The intra-day electrical load controller includes a computing system or processor for executing one of more software programs to provide the functionality to control intra-day electrical load demand in accordance with the present invention. The intra-day electrical load controller includes a timer module configured to monitor a current time and to divide a day into a plurality of time periods.

Also included is one or more databases 418 used to store computer software to be executed by the intra-day electrical load controller, and data used or generated by the intra-day electrical load controller. These data include, but are not limited to, a current customer price for each one the plurality of time periods, weather condition data, baseline electrical load data, historical data on electrical demand, data on fractions of total daily electrical usage across all time periods, an upper threshold and a lower threshold for any fraction of total daily electrical usage in any time period, a cost of electricity to the supplier of the electrical load, i.e., the electrical load distribution system, a pre-defined limit on a total cost of electricity to any single customer, a baseline total cost to each customer and customer price incentives for each one of the plurality of time periods. Each time period represents a separate and distinct time of day interval, and the sum of all time periods equals twenty four hours The electrical load prediction module is in communication with the database to obtain data and store data and uses these data to express electrical load during each time period as a function of customer utility valuation during that time period. The customer utility valuation is a function of at least one incentive signal, e.g., a customer price for electricity, during that time period that can be adjusted to affect electrical consumption or load during each one of the plurality of time periods and therefore across all time periods. In addition, the electrical load prediction module calculates a fraction of total daily electrical usage for each time period by dividing the electrical load for that time period by a sum of all electrical loads for all time periods. Preferably, this electrical load is an exponential function of customer utility valuation, and customer utility valuation is based on additional data including weather condition data and the time of day information.

In order to forecast future intra-day electricity loads for the plurality of time periods, the electrical load prediction module uses fractions of total daily electrical load or usage for all time periods, i.e., the electrical load for a given time period divided by the sum of electrical load across all time periods. A baseline electrical load for each time period is generated by the electrical load prediction module and is stored in the database. The historical data on electrical demand that is stored in the database is used by the electrical load prediction module to establish the baseline electrical load for each time period. The electrical load prediction module is further configured to modify the incentive signal such as customer price for electricity during at least one time period to change the customer utility, which affects the electrical load and the fraction of total daily electrical load associated with that time period. Preferably, the customer price is modified for all time periods in order to create or predict the desired load profile for an entire 24 hour period.

Figure 5:
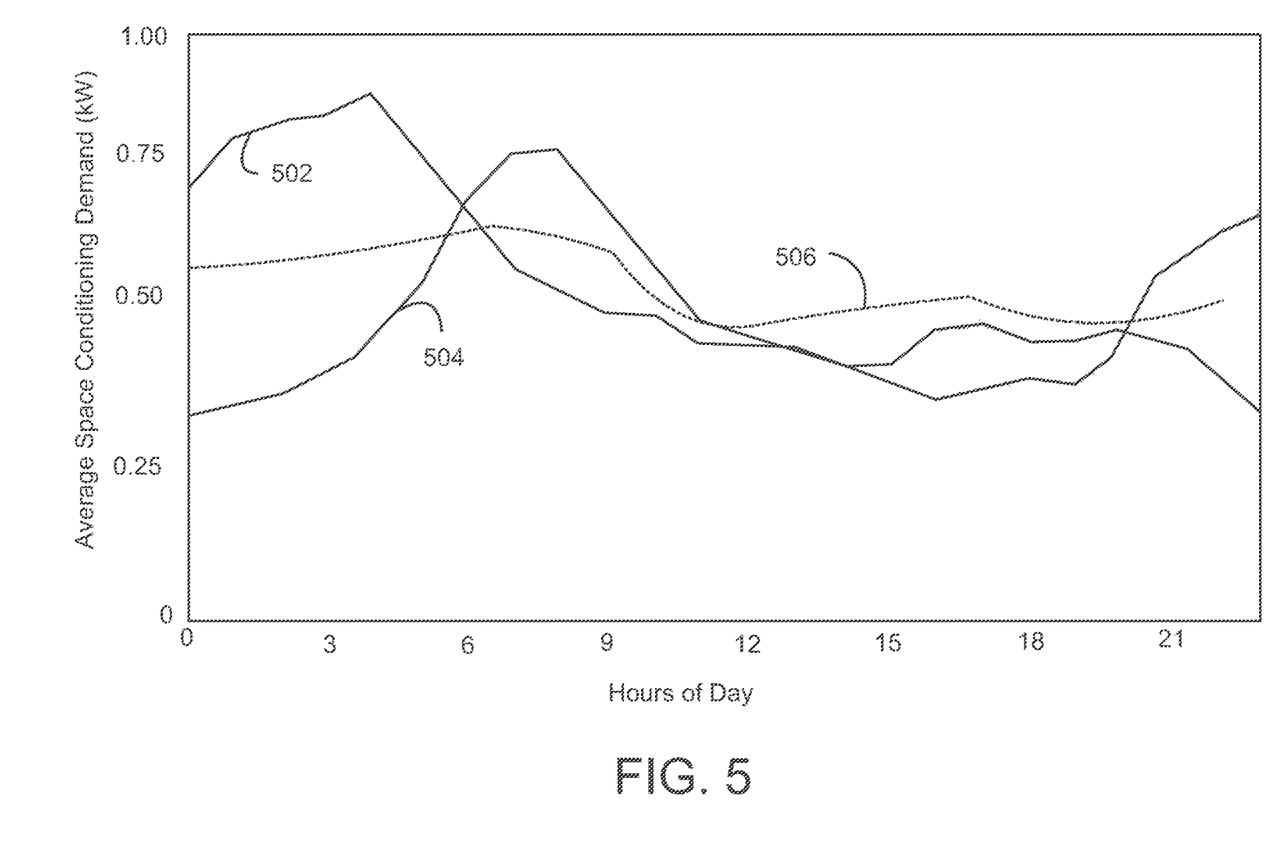
FIG. 5 is a graph illustrating a comparison of an embodiment of a time-of-day peak load mitigation versus a peak load migration.

Therefore, the electrical load prediction module modifies the incentive signal to minimize a variance among the fractions of total daily electrical usage across all time periods, i.e., to minimize spikes and valleys in the load profile. The peak electrical load can also be moved from a first time period to a second time period while maintaining or decreasing this peak below a pre-defined upper threshold. Referring to FIG. 5, a graph illustrating the migration of peak electrical load during a given 24 hour period versus the mitigation of the peak electrical load achieved in accordance with the present invention is illustrated. A baseline time of day dependent load 504 has a peak of about 0.75 kW average space conditioning demand that occurs from about 7 hours to 9 hours. A traditional peak pricing control load 502 results in an adverse peak shift having a peak in excess of 0.75 kW at from about 5 hours to about 6 hours. There is also a steeper off-peak load drop. The present invention provides an optimal load profile 506 having a lowered peak load and less off-peak load drop.

In one embodiment, the electrical load prediction module is further configured to identify an upper threshold and a lower threshold for any fraction of total daily electrical usage in any time period and to modify the customer price to maintain the fractions of total daily electrical usage across all time periods within the upper and lower thresholds. In one embodiment, the system is agnostic to profit and does not take into account the cost of generating electricity or acquiring electrical from power generators. Alternatively, the electrical load prediction module is configured to account for a cost of electricity to the supplier, i.e., distribution system, of the electrical load. This can be a function of demand, as a higher demand or demand spikes may create the need to turn on or increase output from an existing electrical power generator within the distribution system or to purchase electrical power on the spot market from an external power generator. The electrical load prediction module is configured to modify the customer price to maximize profitability to the supplier of the electrical load based on the forecast cost of the electrical power. The electrical load prediction module modifies the customer price to affect demand throughout the day in order to maximize profitability by minimizing the need to purchase higher cost electrical power. This is subject to a pre-defined limit on a total cost of electricity to any single customer.

In one embodiment, the electrical load prediction module is configured to use the established baseline electrical load for each time period and the associated customer price for electricity to determine a baseline total cost to the customer. The customer price for electricity is modified during at least one time period to change the customer utility, the electrical load and the fraction of total daily electrical usage associated with that time period while maintaining a modified total cost to the customer at a value less than or equal to the baseline total cost to the customer. In one embodiment, the electrical load prediction modules is further configured to display customer price incentives for each one of the plurality of time periods to customers to achieve a desired distribution of fractions of total daily usage across all time periods. The customer price incentives are determined from modifying the customer price for electricity to change fractions of total daily electrical usage.

Exemplary embodiments in accordance with the present invention are also directed to a method for controlling intra-day electrical load by dividing a given day into a plurality of discrete and separate time periods. The number of time periods can be varied from 2 or more, e.g., 12 or 24, and these time periods may be all of equal length or may be of variable length. In general, the time periods represent a single day, adding to 24 hours, and the divisions are determined by a typical demand profile throughout the day in order to provide for the desired modifications of demand and minimization of demand variance across all time periods. An electrical load during each time period is expressed as a function of customer utility valuation during that time period. This customer utility valuation is a function, preferably an exponential function, of at least one incentive signal such as a customer price for electricity during that time period. The time of day and current or historical weather conditions may also be considered in the customer utility function. A fraction of total daily electrical load for each time period is calculated by dividing the electrical load for that time period by a sum of all electrical loads for all time periods.

These fractions of total daily electrical load for all time periods are used to forecast future intra-day electricity loads for the plurality of time periods. In one embodiment, the fractions of total daily load are used to forecast future intra-day electricity loads by establishing a baseline electrical load for each time period. The baseline electrical load for each time period is established using historical data on electrical demand. In one embodiment, the incentive signal for electricity during at least one time period is modified in order to change the customer utility, the electrical load and the fraction of total daily electrical load associated with that time period. Preferably, the incentive signal is modified for more than one time period, e.g., for all time periods. In one embodiment, the incentive signal is modified in order to minimize a variance among the fractions of total daily electrical load across all time periods, i.e., to create the flattest load profile possible for a given 24 hour period. For example, an upper threshold and a lower threshold are identified for any fraction of total daily electrical usage in any time period, The incentive signal is then modified in order to maintain the fractions of total daily electrical usage across all time periods within the upper and lower thresholds.

In order to account for a cost of electricity to the electrical distribution system supplier of the electrical load, the customer price is modified to maximize profitability to the supplier of the electrical load, preferably subject to a predefined limit on a total cost of electricity to any single customer. In one embodiment, the established baseline electrical load for each time period and the associated customer price for electricity are used to determine a baseline total cost to the customer. The customer price for electricity during at least one time period is modified to change the customer utility, the electrical load and the fraction of total daily electrical usage associated with that time period while maintaining a modified total cost to the customer at a value less than or equal to the baseline total cost to the customer. In another embodiment, customer price incentives are displayed for each one of the plurality of time periods to customers to achieve a desired distribution of fractions of total daily usage across all time periods. The customer price incentives are determined from modifying the customer price for electricity to change fractions of total daily electrical usage.

Figure 6:
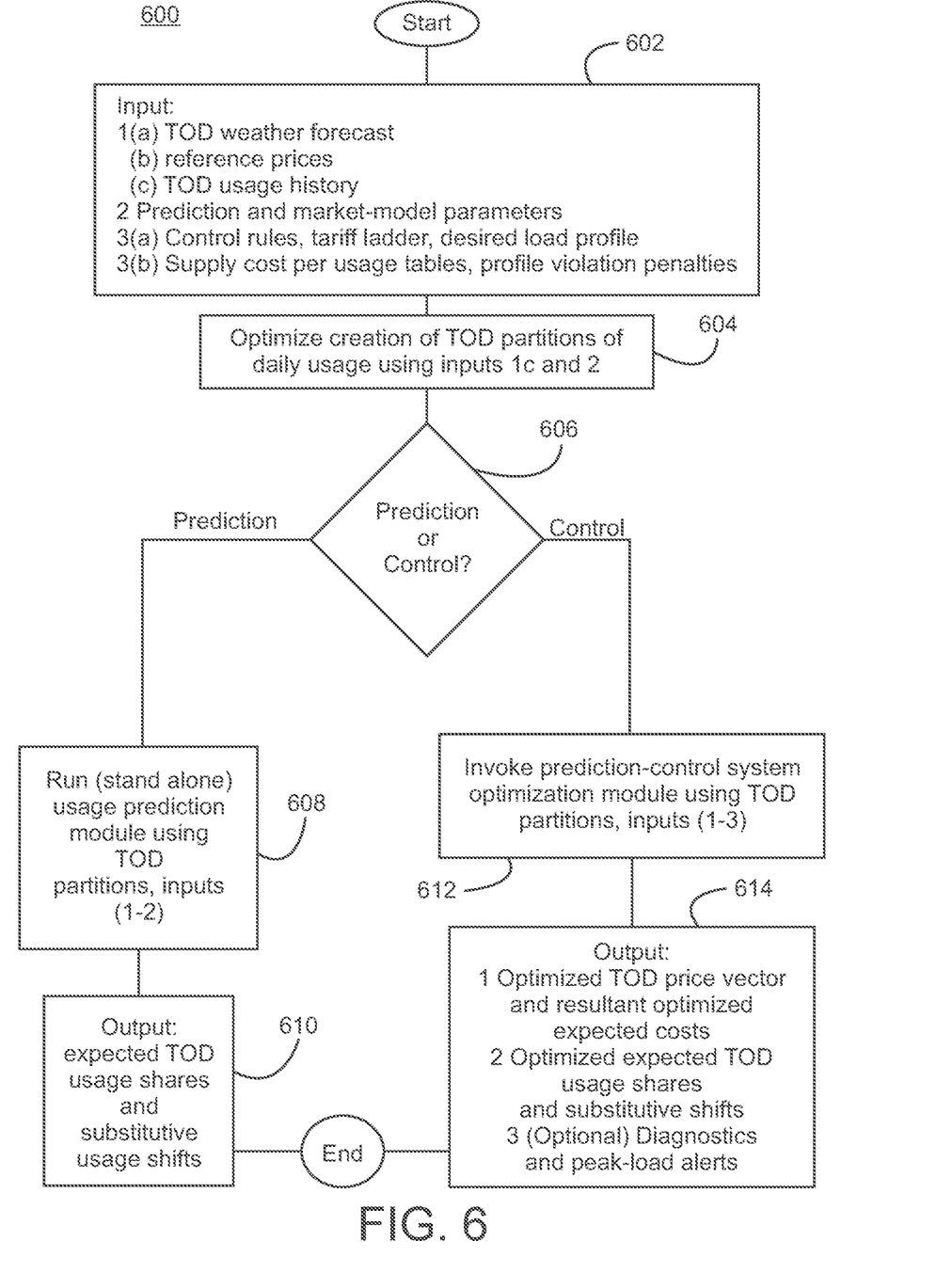
FIG. 6 is a flow chart illustrating an embodiment of prediction or controlling intra-day electrical load in accordance with the present invention.

Referring to FIG. 6, an embodiment of a method for predicting or controlling intra-day electrical load 600 is illustrated. The data and parameters used for predicting or controlling intra-day electrical load are inputted 602. These parameters include time-of-day weather forecasts, reference prices, time-of-day usage history, prediction and market-model parameters, control rules, tariff ladders, desired load profiles, supply cost per usage tables and profile violation penalties. These inputs are used to define the time-of-day partitions 604. A determination is then made regarding whether to predict intra-day load or control intra-day load 606. For predicting intra-day load, a usage prediction module is executed using the defined time-of-day partitions, the weather forecast, the reference prices, the usage history, and the prediction and market-model parameters 608. This yields the expected time-of-day usage shares and the substitutive usage, i.e., load, shifts 610. For controlling intra-day load, the prediction control system optimization module is invoke using the using the defined time-of-day partitions, the weather forecast, the reference prices, the usage history, the prediction and market-model parameters, the supply cost per usage tables and the profile violation penalties 612. This yields an optimized time-of-day price vector and resultant optimized expected costs, an optimized expected time-of-day usage shares and substitutive shifts and diagnostics and peak-load alerts 614.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for summarizing resource description framework datasets in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A system for controlling intra-day electrical load, the system comprising:
    an electrical power distribution system comprising:
        at least one electrical power generator;
        an electrical grid in communication with the electrical power generator; and
        an electrical power grid controller to monitor electrical load demand in the electrical power distribution system and to control distribution of electrical power from the electrical power generator through the electrical grid; and
    an intra-day electrical load controller in communication with the electrical power grid controller, the intra-day electrical load controller comprising:
        a timer module configured to monitor a current time and to divide a day into a plurality of time periods;
        a database comprising electrical load data, price per unit of electricity for a given time-of-day data, a baseline price and a desired load profile across the plurality of time periods;
        an electrical load prediction module in communication with the database and configured to:
            calculate a predicted fraction of total daily usage in each one of the plurality of time periods as a ratio of a value of a variable comprising an exponential function of a measure of customer utility for electricity in a given time period to a sum of values of the variable for all time periods, each measure of the customer utility comprising a function of the natural log of a recommended price per unit of electricity usage at a given time-of-day multiplied by an estimated price effect coefficient;
            predict a day-ahead load profile comprising the predicted fraction of total daily usage in each one of the plurality of time periods;
            adjust the price per unit of electricity for one or more given time-of-days within a predefined range from the baseline price per unit of electricity to minimize a deviation of the predicted day-ahead load profile from the desired load profile across the plurality of time periods; and
            display each adjusted price per unit electricity for the given time-of-day to a plurality of customers in the electrical power distribution system as consumer price incentive values.

2. The system of claim 1, wherein the measure of customer utility further comprises a function of temperature and a weekend indicator variable.

3. The system of claim 1, wherein the electric load prediction module is configured to adjust the price per unit of electricity for one or more given time-of-days to minimize a variance among the predicted fractions of total daily usage in each one of the plurality of time periods.

4. The system of claim 1, wherein the electric load prediction module is further configured to:
    estimate a total daily electricity usage; and
    multiply the estimated total daily electricity usage by the predicted day-ahead load profile to predict a day-ahead electricity usage profile.

5. The system of claim 1, wherein the electric load prediction module is further configured to:
    account for a cost of electricity to a supplier of the electrical load; and
    adjust the price per unit of electricity for one or more given time-of-days to maximize profitability to a supplier of the electrical load subject to a pre-defined limit on a total cost of electricity to any single customer.

* * * * *